US005623324A

United States Patent [19]

Dassero et al.

[11] Patent Number: 5,623,324

[45] Date of Patent: Apr. 22, 1997

[54] VARIABLE VIEWFINDER MASK ASSEMBLY

[75] Inventors: William F. Dassero; Anthony DiRisio, both of Rochester, N.Y.

[73] Assignee: Eastman Kodak Company, Rochester, N.Y.

[21] Appl. No.: 448,944

[22] Filed: May 24, 1995

[51] Int. Cl.$^{6}$ .......... G03B 13/10; G03B 13/02

[52] U.S. Cl. .......... 396/380

[58] Field of Search .......... 354/222, 223

[56] References Cited

U.S. PATENT DOCUMENTS

| | | | |
|---|---|---|---|
| 2,149,384 | 3/1939 | Becker . | |
| 2,157,548 | 5/1939 | Leitz | 88/1.5 |
| 2,187,246 | 1/1940 | Nerwin . | |
| 2,943,549 | 7/1960 | Nerwin . | |
| 4,251,149 | 2/1981 | Kimura | 354/222 |
| 5,255,030 | 10/1993 | Mukai et al. | 354/94 |
| 5,345,285 | 9/1994 | Hasushita et al. | 354/159 |

*Primary Examiner*—Michael L. Gellner
*Assistant Examiner*—Daniel Chapik
*Attorney, Agent, or Firm*—Roger A. Fields

[57] ABSTRACT

A variable viewfinder mask assembly is adjustable to provide three different rectangular mask openings; the first and second of such openings being of the same height but of different widths and the first and third of said openings being of the same width but of different heights. Means are also provided to prevent overtravel of a drive member from influencing the adjustments of the mask openings.

4 Claims, 3 Drawing Sheets

VARIABLE VIEWFINDER MASK ASSEMBLY

BACKGROUND OF THE INVENTION

1. Field of the Invention

The invention relates generally to the field of photographic cameras and, in particular, to a camera viewfinder mask that is adjustable so that the field of view of the viewfinder can correspond to any of several different film image formats.

2. Description of the Prior Art

Many cameras in the past have been provided with viewfinders that are adjustable to different settings to change the size of the field of view in accordance with the adjustment of a zoom lens or the substitution of lenses of different focal lengths. Typically such adjustments are made by means of a mask with two blades that are moved in opposite directions along a straight path diagonal to the rectangular viewfinder frame, as illustrated, for example in U.S. Pat. No. 2,157,548. In such viewfinders, the aspect ratio of the field of view, i.e. the ratio of its height to its width, remains unchanged. As also shown in the '548 patent, such a viewfinder can be provided with means for compensating for parallax when the subject is close to the camera.

In a similar type of device, as illustrated, for example, in FIGS. 2 and 11A of U.S. Pat. No. 5,255,030, the two blades are moved in opposite directions along a straight path that angled, but not truly diagonal to the frame. In this case, different frame aspect ratios may be obtained, but both the height and width of the frame are varied continuously in the same sense. Accordingly, such a device cannot provide two different formats with the same height or width or three formats that vary other than in the specific manner dictated by such a straight movement path.

It is also known to provide a camera viewfinder with an adjustable mask device in which two blades are moved in opposite directions relative to each other by irregularly shaped cam slots or the like to adjust the viewfinder field to several different aspect ratios, as shown, for example, in U.S. Pat. No. 5,345,285. This type of device, however, tends to be rather complicated and bulky.

Because the types of adjustment mechanisms disclosed in the foregoing '548, '030 and '285 patents use cam surfaces or equivalent means to move the masking blades continuously between their different settings, any error in the positioning of the adjustment means produces a corresponding error in the field of view that is visible in the viewfinder.

In the type of camera to which an adjustable viewfinder mask in accordance with the present invention is particularly well suited, another adjustable mask device is employed to mask the film in the exposure plane so that the image can be exposed selectively in any of several different formats. When this adjustment of the film masking means is carried out, it automatically effects the corresponding adjustment of the viewfinder mask. Accordingly, with the types of viewfinder mask adjusting devices previously described, the coincidence between the format exposed on the film and the field of view of the viewfinder is dependent on the accuracy of the mechanism that couples the two masking devices. This results in more complexity and higher costs than are desired, particularly in the case of relatively small and inexpensive cameras.

SUMMARY OF THE INVENTION

The present invention is directed to providing an adjustable viewfinder masking device that is simple, compact and inexpensive and that can be coupled to other camera devices by simple mechanisms with relatively low tolerances. More specifically, the present invention contemplates an adjustable viewfinder masking device that includes two slidable blades and a fixed rectangular aperture. In a first or HD setting, both blades are beyond the fixed aperture, which therefore defines the field of view. In a second or 3R setting, vertical edges of the blades overlap the respective ends of the fixed aperture to define a second field of view that is the same height as but narrower than that of the first setting. In the third or panoramic setting, horizontal edges of the blades overlap the respective horizontal edges of the fixed aperture and thereby define a field of view the same width as but lower than that of the first setting. The blades are guided by cam slots and are driven by a rotatable blade actuator member that, in turn, is rotated in opposite directions from a central position by a drive member that can be connected to another camera mechanism. The drive member includes a pin that engages a slot in the rotatable member to effect rotation thereof. The pin can escape from the slot if the drive member moves beyond the positions that define the second or third settings, thus preventing overtravel of the drive means from influencing the proper location of the blades in those settings. Accordingly, it is only necessary to insure that the drive member move far enough to effect the required mask blade adjustments, but it is not necessary to stop the drive member precisely at the positions corresponding to the second and third mask settings.

Various means for practicing the invention and other advantages and novel features thereof will be apparent from the following description of an illustrative preferred embodiment, reference being made to the accompanying drawings.

DESCRIPTION OF THE ILLUSTRATIVE PREFERRED EMBODIMENT

Figure 1:
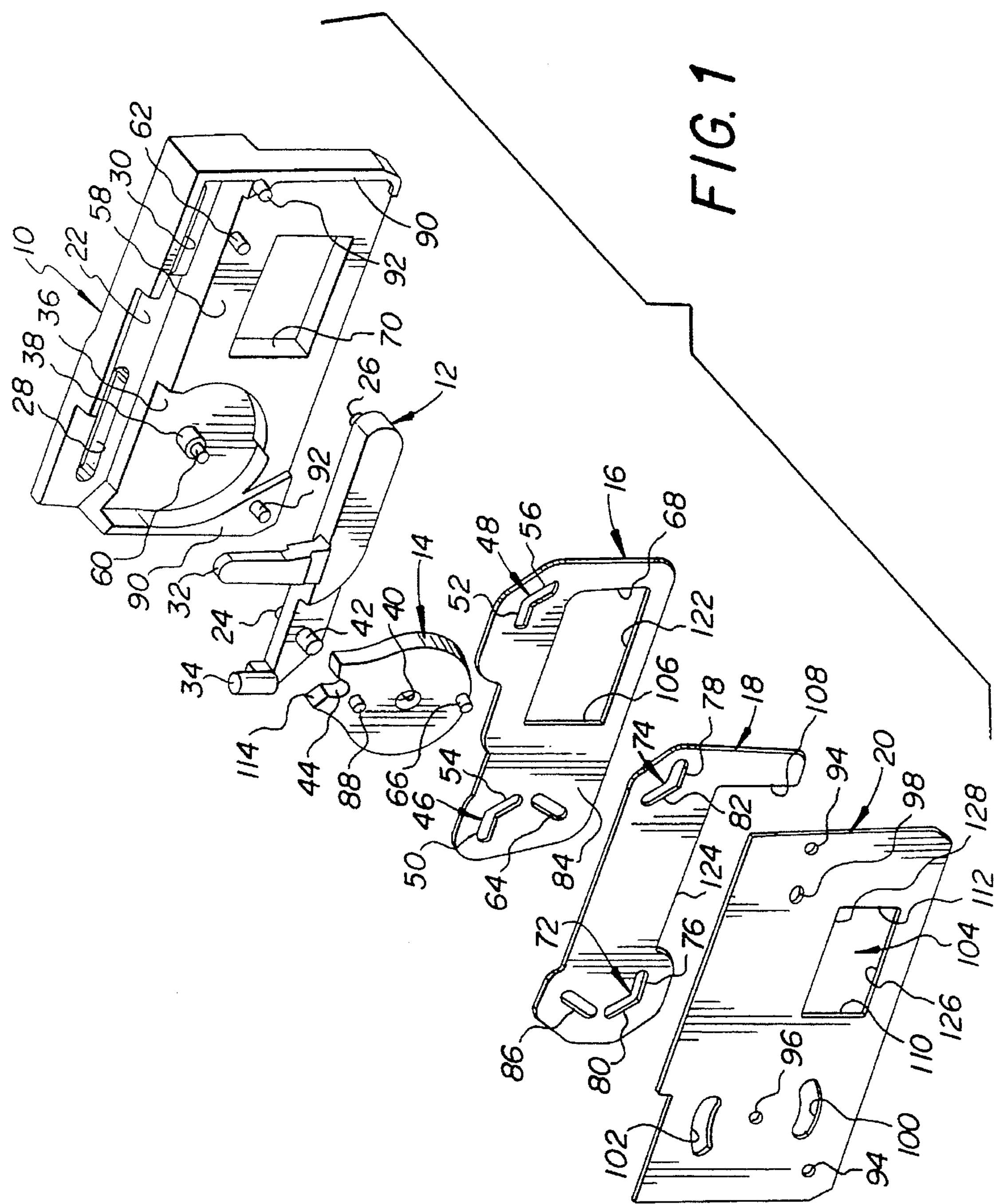
FIG. 1 is an exploded perspective illustration of an adjustable viewfinder mask device in accordance with a preferred illustrative embodiment of the invention.

FIG. 1 of the accompanying drawings best depicts the overall construction of the subject viewfinder mask device, which comprises a molded plastic housing member 10, drive member 12, blade actuator member 14, respective back and front blade members 16 and 18, and aperture plate 20.

Drive member 12 is received in a channel 22 in housing member 10, in which it is supported for sliding horizontal movement by pins 24 and 26 extending into respective housing member slots 28 and 30. A finger 32 extends upwardly from the drive member and is adapted to be moved laterally by a manually operated slide member or the like, not shown, that is accessible from the exterior of the camera housing to adjust the mask device to its different settings. A vertical connector pin 34 at one end of the drive member is adapted to connect the latter to a film masking device or other mechanism, not shown, that is adjusted concurrently with the viewfinder mask.

Blade actuator member 14 is located in cavity 36 in housing 10 and is supported for reciprocative rotary movement by stud 38 received in pivot hole 40. A drive pin 42 on drive member 12 is adapted to be received in a slot 44 in member 14, whereby horizontal sliding movement of the drive member produces rotational movement of the blade actuator member.

The back mask blade 16 is provided with first and second cam slots 46 and 48 that comprise respective horizontal portions 50 and 52 and downwardly extending diagonal portions 54 and 56. This back blade is located against housing surface 58 with pin 60 at the end of stud 38 extending through blade slot 46 and with housing pin 62 extending through blade slot 48. A sloped slot 64 in blade 16 receives the lower actuator pin 66 on blade actuator 14 to translate rotational movement of the blade actuator into movement of the back blade along a path defined by the configuration of its cam slots 46 and 48. As shown at numeral 68, the back blade 16 is provided with a rectangular opening that is located forwardly of a rectangular opening 70 in housing 10.

The front mask blade 18 is provided with first and second cam slots 72 and 74 that comprise respective horizontal portions 76 and 78 and upwardly extending diagonal portions 80 and 82. This front blade is located against the front face 84 of the back blade 16 with stud pin 60 extending through first blade slot 72 and with housing pin 62 extending through second blade slot 74. A sloped slot 86 in blade 18 receives the upper actuator pin 88 of blade actuator 14 to translate rotational movement of the blade actuator into movement of the front blade, in opposite directions to the movement of the back blade, along a path defined by the configuration of the cam slots 72 and 74.

The above-described movable components 12 through 18 of the mask device are held in place by aperture plate 20, which is seated against edge rails 90 of housing member 10 and secured by thermally softening and swaging the ends of rivet pins 92 extending through corresponding holes 94 in the aperture plate. Openings 96, 98, 100 and 102 in the aperture plate allow the respective pins 60, 62, 66 and 88 of the housing member and the blade actuator member to extend through the blade members without interfering with the aperture plate. A rectangular aperture 104 in the aperture plate is aligned with the larger rectangular housing opening 70, which has no influence on the field of view of the viewfinder.

Figure 2:
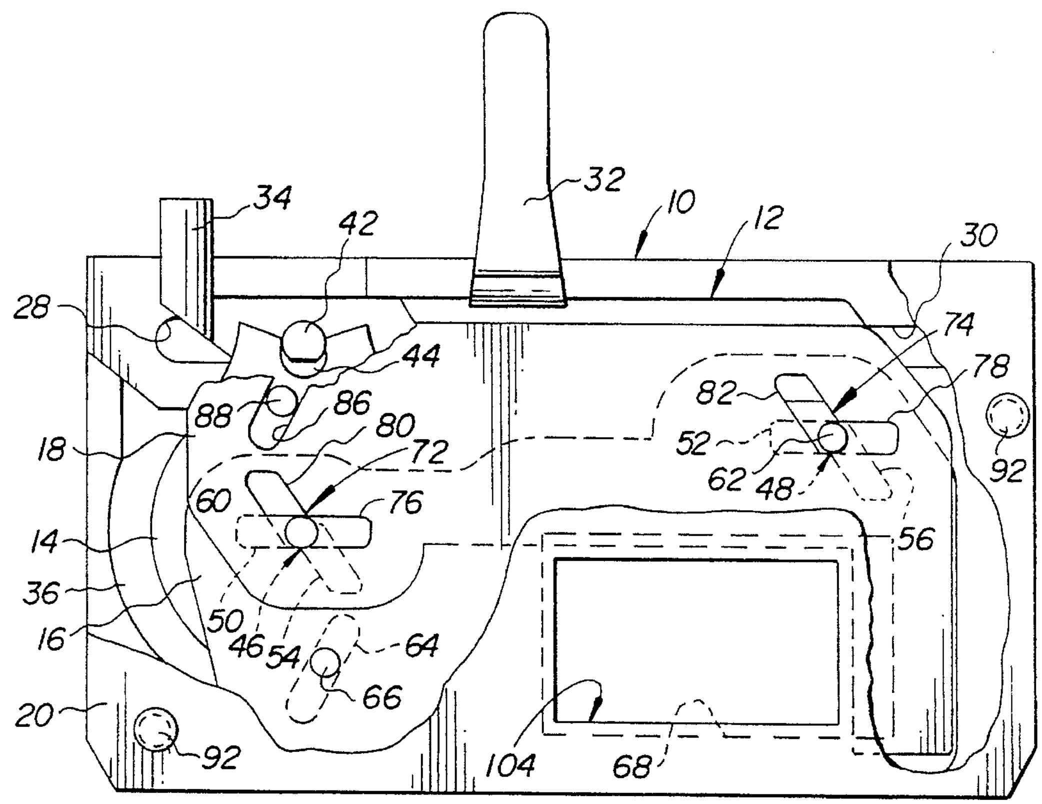
FIG. 2 is a front elevational view of the mask device depicted in FIG. 1, shown partly broken away to illustrate the locations of the movable components when the mask device is adjusted to the first or HD setting.

When the drive member 12 is locate at its central or first setting position, the corresponding location of blade actuator 14 causes the two mask blades to be positioned as best shown in FIG. 2, with no part of either blade within the field of view defined by aperture 104. Accordingly, that aperture defines the HD viewing frame, which corresponds to the format of a high density television image, commonly referred to as an HDTV image. Because the blades are well beyond the edges of aperture 104 when the drive member is positioned as shown, there is considerable latitude to the location in which the drive member adjusts the mask device to its first setting.

Figure 3:
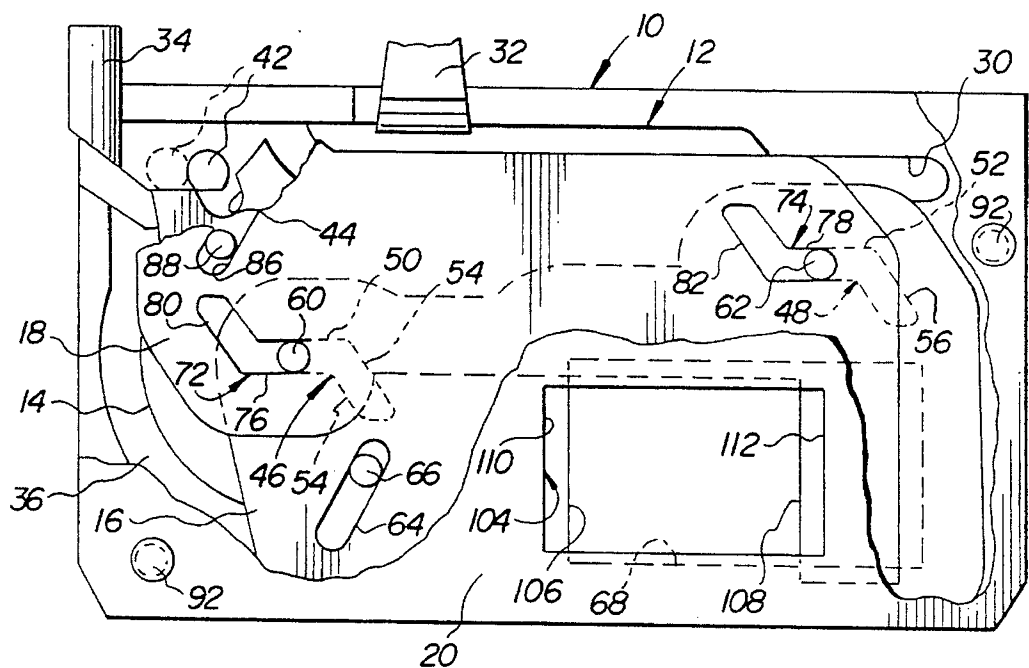
FIG. 3 corresponds to FIG. 2, but illustrates the mask device adjusted to the second or 3R setting.

When the drive member is moved to the left to its second setting position, shown in FIG. 3, the blade actuator causes the two blades 16 and 18 to move horizontally in opposite directions along paths defined by the horizontal portions 50, 52, 76 and 78 of the respective blade cam slots 46, 48, 72 and 74. Therefore, when the drive member reaches its depicted position, the inner left edge 106 of the back blade 16 and the inner right edge 108 of the front blade overlap the corresponding left and right edges 110 and 112 of aperture 104 by equal distances to thereby reduce the effective width of that aperture without changing its height. This provides the 3R viewing format, which corresponds to a typical 35 mm image format.

Figure 5:
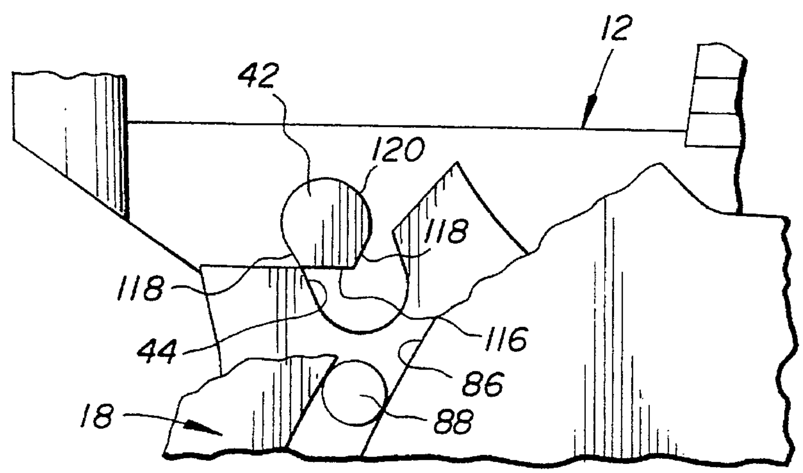
FIG. 5 is an enlarged portion of FIG. 3, showing the drive pin and the slotted portion of the blade actuator.

FIG. 3 depicts the position of the drive pin 42 when it has just completed the movement of the blade actuator to its required position, i.e. the position at which blade actuator slot 44 has just disengaged the drive pin. However, housing slots 28 and 30 are long enough to allow the drive member to move somewhat beyond its depicted position, as shown by the broken line representation of drive pin 42 in FIG. 3 thus allowing considerable tolerance leeway in the connection of the variable mask device to other camera elements that are adjusted concurrently therewith. Because the drive pin cannot move beyond the adjacent edge 114 of the blade actuator, vibration or other influences cannot move the latter such that the pin will not re-enter the slot when the drive member is again moved toward the right. As shown in FIG. 5, which corresponds to an enlarged portion of FIG. 3, the drive pin 66 is generally cylindrical, but has a flat lower face 116 with tangential flank faces 118 joining the lower face to the cylindrical pin surface 120. As compared to a completely cylindrical pin, this pin shape decreases the distance by which the drive member must move in either direction to complete the corresponding mask adjustment.

Figure 4:
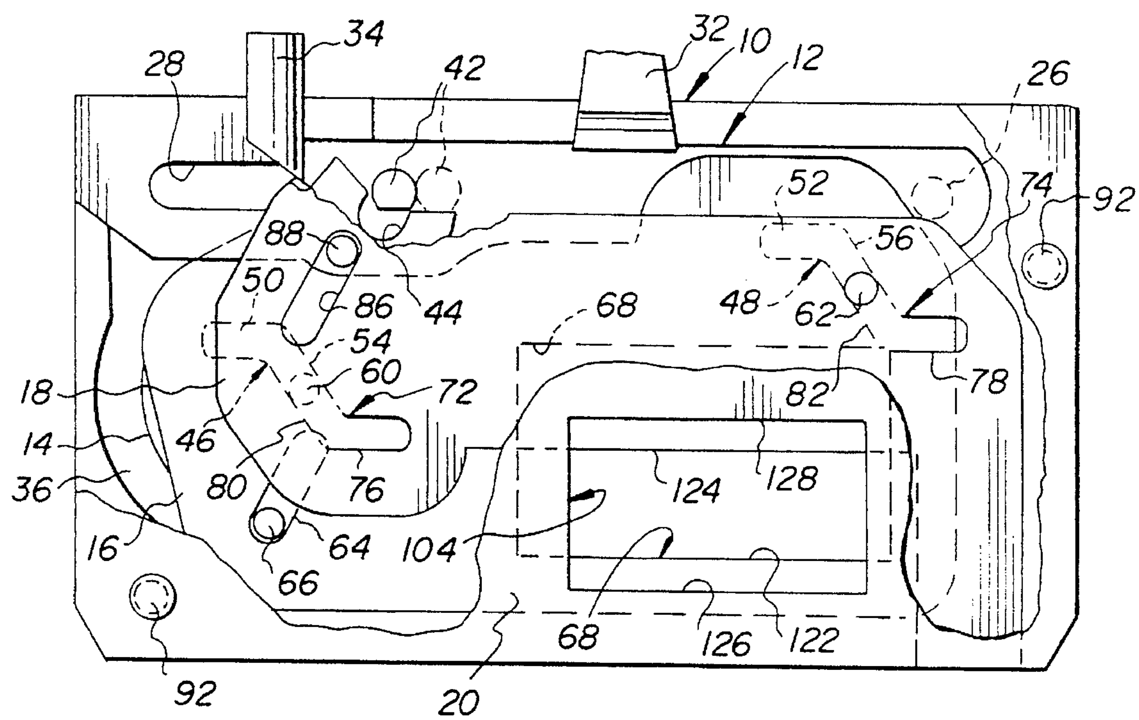
FIG. 4 corresponds to FIGS. 2 and 3 but shows the mask device adjusted to the third or panoramic setting.

When the drive member is moved to the right to its third setting position, shown in FIG. 4, the blade actuator causes the two blades 16 and 18 to move diagonally in opposite directions along paths defined by the diagonal portions 54, 56, 80 and 82 of the respective blade cam slots 46, 48, 72 and 74. Therefore, when the drive member reaches its depicted position, the inner edge 122 of the rectangular back blade opening 68 and the inner edge 124 of the front blade 18 overlap the corresponding lower and upper edges and 128 of aperture plate aperture 104 by equal distances to thereby reduce the effective height of that aperture without changing its width; thus providing the panoramic format. In the same manner described above in connection with FIGS. 3 and 5, slots 28 and 30 allow the drive pin to overshoot the position at which the aperture is properly adjusted, as shown in broken lines, without adversely influencing the mask adjustment.

The invention has been described in detail with reference to an illustrative preferred embodiment, but it will be understood that variations and modifications will occur to those skilled in the art. The claims should be interpreted to fairly cover all such variations and modifications within the true spirit and scope of the invention.

PARTS LIST FOR FIGS.

| Reference No. | Part |
|---|---|
| 10. | Housing Member |
| 12. | Drive Member |
| 14. | Blade Actuator |
| 16. | Back Blade |
| 18. | Front Blade |
| 20. | Aperture Plate |
| 22. | Channel |
| 24. | Drive Member Pin |
| 26. | Drive Member Pin |

-continued

PARTS LIST FOR FIGS.

| Reference No. | Part |
|---|---|
| 28. | Housing Slot |
| 30. | Housing Slot |
| 32. | Finger |
| 34. | Connector Pin |
| 36. | Cavity |
| 38. | Stud |
| 40. | Blade Actuator Pivot Hole |
| 42. | Drive Pin |
| 44. | Blade Actuator Slot |
| 46. | Back Blade First Cam Slot |
| 48. | Back Blade Second Cam Slot |
| 50. | Horizontal Portion of Back Blade First Cam Slot |
| 52. | Horizontal Portion of Back Blade Second Cam Slot |
| 54. | Diagonal Portion of Back Blade First Cam Slot |
| 56. | Diagonal Portion of Back Blade Second Cam Slot |
| 58. | Housing Surface |
| 60. | Pin on Housing Stud |
| 62. | Housing Pin |
| 64. | Sloped Back Blade Slot |
| 66. | Lower Actuator Pin |
| 68. | Rectangular Back Blade Opening |
| 70. | Rectangular Housing Opening |
| 72. | Front Blade First Cam Slot |
| 74. | Front Blade Second Cam Slot |
| 76. | Horizontal Portion of Front Blade First Cam Slot |
| 78. | Horizontal Portion of Front Blade Second Cam Slot |
| 80. | Diagonal Portion of Front Blade First Cam Slot |
| 82. | Diagonal Portion of Front Blade Second Cam Slot |
| 84. | Front Face of Back Blade |
| 86. | Sloped Front Blade Slot |
| 88. | Upper Actuator Pin |
| 90. | Housing Edge Rails |
| 92. | Rivet Pins |
| 94. | Rivet Holes in Aperture Plate |
| 96. | Aperture Plate Opening for Pin 60 |
| 98. | Aperture Plate Opening for Pin 62 |
| 100. | Aperture Plate Opening for Pin 66 |
| 102. | Aperture Plate Opening for Pin 88 |
| 104. | Rectangular Aperture in Aperture Plate |
| 106. | Inner Left Edge of Back Blade |
| 108. | Inner Right Edge of Front Blade |
| 110. | Left Edge of Aperture |
| 112. | Right Edge of Aperture |
| 114. | Edge of Blade Actuator |
| 116. | Flat Lower Face of Drive Pin |
| 118. | Tangential Flank Faces of Drive Pin |
| 120. | Cylindrical Surface of Drive Pin |
| 122. | Inner Edge of Rectangular Back Blade Opening |
| 124. | Inner Edge of Front blade |
| 126. | Lower Edge of Aperture Plate Aperture |
| 128. | Upper Edge of Aperture Plate Aperture |

What is claimed is:

1. A variable mask device for the viewfinder of a camera, characterized by:

an aperture plate provided with a rectangular aperture;

first and second movable mask blades; and adjusting means for selectively adjusting said mask blades to a first setting in which said blades are located beyond said aperture so that said aperture defines a first rectangular mask opening, a second setting in which said blades overlap the respective ends of said aperture so that said blades and said aperture define a rectangular second mask opening the same height as but narrower than said first mask opening, and a third setting in which said blades overlap the respective upper and lower edges of said aperture so that said blades and said aperture define a third mask opening the same width as but of less height than said first opening; including, means for moving said blades horizontally in opposite directions between said first and second settings and diagonally in opposite directions between said first and third settings; and blade support pins extending through cam slots in said blades to support said blades for such horizontal and diagonal movement.

2. The invention of claim 1 in which said device includes a pivotally supported blade actuator member 0 connected respectively to said blades at different points and supported between said points for rotational movement in a first direction from a central position to effect movement of said blades from said first setting to said second setting and in a second direction from said central position to effect movement of said blades from said first setting to said third setting.

3. The invention of claim 2 including a drive member provided with a pin that is movable along a fixed path, said blade actuator including a slot adapted to receive said pin whereby movement of said pin effects rotational movement of said actuator, said pin being removed from said slot when said pin moves beyond the respective positions at which said blades are adjusted to said second and third positions, to thereby allow overtravel of said drive member without influencing the setting of said blades.

4. A variable mask device for the viewfinder of a camera, characterized by:

a pivotally supported actuator member that is rotatable in a clockwise direction from a first position in which said device is thereby adjusted to a first setting to a second position in which said device is thereby adjusted to a second setting and in a counter-clockwise direction said first position to a third position in which said device is thereby adjusted to a third setting, a drive member including a drive pin movable along a predetermined path, said actuator member having a slot adapted to receive said pin whereby movement of said drive member effects rotational movement of said actuator member, said slot being beyond the path of movement of said drive pin when the latter moves beyond the respective positions at which said device is adjusted to said second and third positions to thereby prevent overtravel of said drive member from influencing the second or third settings of said device.

* * * * *